United States Patent [19]

Moskowitz et al.

[11] 4,407,518
[45] Oct. 4, 1983

[54] NONBURSTING MULTIPLE-STAGE FERROFLUID SEAL AND SYSTEM

[75] Inventors: Ronald Moskowitz; Kuldip Raj, both of Merrimack; James L. Kern, Nashua, all of N.H.

[73] Assignee: Ferrofluidics Corporation, Nashua, N.H.

[21] Appl. No.: 455,065

[22] Filed: Jan. 5, 1983

[51] Int. Cl.³ .................... F16J 15/40; F16J 15/54
[52] U.S. Cl. ............................... 277/1; 277/80; 277/135; 277/3; 277/2
[58] Field of Search ........... 277/1, 80, 135, DIG. 7, 277/DIG. 8, 3, 15, 2

[56] References Cited

U.S. PATENT DOCUMENTS

| | | | |
|---|---|---|---|
| 4,054,293 | 10/1977 | Hoeg et al. | 277/80 X |
| 4,335,885 | 6/1982 | Heshmat | 277/80 X |

FOREIGN PATENT DOCUMENTS

| | | | |
|---|---|---|---|
| 55-33921 | 3/1980 | Japan | 277/80 |
| 655858 | 4/1979 | U.S.S.R. | 277/80 |
| 781469 | 11/1980 | U.S.S.R. | 277/80 |

*Primary Examiner*—Robert S. Ward, Jr.
*Attorney, Agent, or Firm*—Richard P. Crowley

[57] ABSTRACT

A nonbursting ferrofluid seal apparatus and system which comprises an annular permanent magnet and annular first and second pole pieces, one end of the pole pieces defining a single-stage ferrofluid seal under one end of one pole piece and a multiple-stage ferrofluid seal under the one end of the other pole piece with the surface of the shaft element with which the seal is employed, the first and second pole pieces and the magnet defining therebetween an interstage volume between the single-stage ferrofluid seal and the multiple-stage ferrofluid seal, and conduit means extending into the interstage volume, and means to maintain a desired pressure in the stage volume, to maintain the first-stage ferrofluid seal in a stable, nonbursting condition, when the seal apparatus is employed between high- and low-pressure environments.

15 Claims, 7 Drawing Figures

A. CRITICALLY BALANCED STAGE

B. CHANGE AT TIME OF BURST

NONBURSTING MULTIPLE-STAGE FERROFLUID SEAL AND SYSTEM

BACKGROUND OF THE INVENTION

Multiple-stage, rotary-shaft ferrofluid seals, such as those described in U.S. Pat. No. 3,620,584, issued Nov. 16, 1971, are often employed to provide a ferrofluid seal about a rotary shaft between a high- and low-pressure environment or different fluid environments, such as, for example, to provide a seal about a rotary shaft which extends from the atmosphere, as the high-pressure environment, into a vacuum chamber as the low-pressure environment. The basic components of a ferrofluid magnetic seal are a permanent magnet, two magnetically permeable pole pieces, a magnetically permeable shaft element, typically a rotary-shaft element which extends between the two environments to be sealed, and a ferrofluid contained to form a ferrofluid O-ring at the end of the pole pieces. In a multiple-stage ferrofluid seal, the shaft or the pole pieces consist of a plurality of teeth or ridges, so that a plurality of separate ferrofluid stages as seals are formed at the radial gap between the surface of the rotating shaft and the one end of the pole piece. The pole piece, the shaft and the permanent magnet provide for concentrated magnetic flux in the radial gap under each stage of the multiple-stage ferrofluid seal. In an ideal situation, all of the magnetic flux lines are confined under each particular stage, and none extend into the interstage volume between the individual stages. Typically, the field strength under a stage generally is $8 \times 10^5$ oersteds per centimeter or less, such as $8 \times 10^5$ to $3 \times 10^4$. The ferrofluid employed is magnetically entrapped under each of the stages, and a series of liquid sealing O-rings is formed, with intervening regions or interstage volumes filled with air. Each of the seal stages can sustain a pressure differential, such as typically a pressure differential of about 0.2 atmospheres. The individual stages act in a cumulative series, to provide a total pressure capacity for the particular multiple-stage ferrofluid seal.

Where a ferrofluid multiple-stage seal is employed in a vacuum application; that is, between a vacuum environment as a low pressure and an atmosphere or a higher than atmosphere as the high pressure, the multiple-stage seal is normally designed to sustain a pressure differential greater than that between the high and low atmosphere, and typically, when the high pressure is the atmosphere and the low pressure is the vacuum, to sustain a pressure differential of greater than about 2 atmospheres, to permit a safety margin in the operation of the seal. After the initial pumping down of the vacuum system to the desired vacuum level, the seal should operate such that there should be no release of air into the pumped-down vacuum system from any interstage region. However, prior-art, conventional ferrofluid seals employed in high-vacuum systems, typically those systems of $10^{-6}$ TORR or less, either under static or dynamic conditions, may permit a burst of air through the seal and to be introduced into the vacuum system. The burst of air occurs at various periodicities, depending on the seal design, ferrofluid inventory and operational conditions. Furthermore, when the ferrofluid seal is started or is employed for the first time, after being in a static condition, a burst of air is also introduced into the vacuum system. In modern, high-vacuum processing systems, these occurrences of burst of air into the system present limitations on the employment of ferrofluid multiple-stage seals.

Therefore, it is desirable to provide for a nonbursting, multiple-stage ferrofluid seal which may be employed in systems to separate high and low pressures, and typically employed to provide an effective nonbursting seal between a vacuum chamber and the outside atmosphere.

SUMMARY OF THE INVENTION

The invention relates to a nonbursting, multiple-stage ferrofluid seal and a high- and low-pressure system in which the seal is employed. In particular, the invention relates to a nonbursting, multiple-stage, single ferrofluid seal apparatus and to a high-vacuum system in which the seal is employed.

The invention comprises a nonbursting, multiple-stage ferrofluid or magnetic liquid seal apparatus, which seal apparatus is adapted to provide a seal about a rotatable shaft element between a first high-pressure and a second low-pressure environment, and typically where the high-pressure environment comprises the atmosphere and the low-pressure environment comprises a vacuum chamber or system. The nonbursting, multiple-stage, single-stage seal apparatus employs an annular permanent magnet adapted to surround the shaft, together with annular first and second pole pieces of magnetically permeable material. The pole pieces extend at the one end into a magnetic-flux relationship with the respective poles of the annular permanent magnet, and at the other end extend into a close, noncontacting relationship with the surface of the shaft to be sealed, to define a radial gap between the ends of the pole pieces and the surface of the shaft. One of the pole pieces at the end, or a portion of the shaft element employed with the ferrofluid seal, or a combination of both, has a plurality of ridges beneath one of the pole pieces, to form a multiple-stage seal positioned toward the high-pressure environment. A plurality of separate stages; that is, the multiple-stage seals, under the one pole piece, provides a defined pressure capacity for the seal apparatus to be used to separate the high- and low-pressure environments. The multipl-stage pressure capacity is designed to be greater than the pressure of the high-pressure capacity, typically with a safety margin of 50% to 100%.

The other pole piece forms at least a single-stage seal with the surface of the shaft element. The single-stage seal is so designed to form a nonbursting seal with the low-pressure environment. Between the single-stage seal of one pole piece and the first multiple-stage seal of the other pole piece, there is defined a first sealed interstage volume. Ferrofluid or a liquid magnetic material is magnetically retained under each end of the respective pole pieces, to provide respective single-stage and multiple-stage seals. The seal apparatus includes a conduit or passageway extending into the first interstage seal volume, and includes a means to remove air from the interstage volume, to maintain the interstage volume between the first single-stage ferrofluid seal and a multiple-stage seal of the other pole piece at a defined pressure between the high and low pressures, and to maintain the first single-stage seal in a stable, nonbursting condition. The seal apparatus is effective in preventing the bursting of air and contamination of the low-pressure system, either under static, dynamic or on/off conditions.

In use, the first interstage region between the first stage and the remaining multiple stages under the other pole piece, which in effect represents the volume underneath the annular or permanent magnet, is maintained at a desired pressure by means of a vacuum pump in fluid communication with a port on the seal housing which leads into the conduit extending into the interstage volume. Thus, for example, in the case of an atmospheric high pressure and a vacuum low pressure, such as in a typical vacuum system, where it is desired to maintain a vacuum at $10^{-6}$ TORR or less, a vacuum pump may be employed in connection with the conduit port, to pump either continuously or on a controlled or monitored basis air from the interstage volume and, thereby, to stabilize the single-stage ferrofluid seal under one pole piece, thereby preventing or significantly reducing air bursts.

The limitation on multiple-stage ferrofluid seals, by periodic air bursts in high- and low-pressure systems, is overcome by the employment of the seal apparatus of the invention. It has been discovered that several factors are believed to contribute to air bursts. One factor involves the eccentricity of the radial gap resulting from the cumulative tolerance of the seal component parts employed in the seal apparatus. Another factor which may effect air bursts includes segregation of the magnetic particles suspended in the ferrofluid resulting from intense magnetic-field gradients normally present in such ferrofluid seals. A further factor would include a nonuniform distribution of the ferrofluid from one stage to another in the multiple-stage seals under a single pole piece, which nonuniform distribution may result from the techniques employed in assembling the ferrofluid multiple-stage seals or by desorption of air from the ferrofluid. Another factor may include defects or damage to the rotatable shaft or the pole pieces employed, typically which are only visible under a microscopic examination. Thus, all of these factors, alone or in combination with other unknown factors, may influence the multiple-stage seal, so that the pressure capacity of the individual stages in the multiple-stage seal is not the same in each stage and in each seal, and, in fact, may change with time.

DESCRIPTION OF THE EMBODIMENTS

Figure 1:
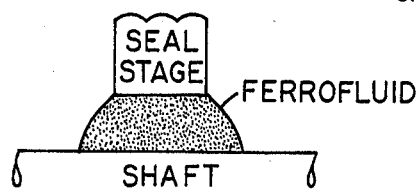
FIG. 1 is a schematic illustration of the ferrofluid seal shape in a single-stage seal.

The problems associated with the pressure capacity of a single-stage seal are illustrated in particular to FIGS. 1-5, which explain the behavior of ferrofluid liquid seals under pressure capacity of a single stage thereof. FIG. 1 shows the fluid shape of a ferrofluid under a single-stage pole piece of a ferrofluid seal, when the pressure on each side of the stage of the seal is the same or approximately the same.

Figure 2:
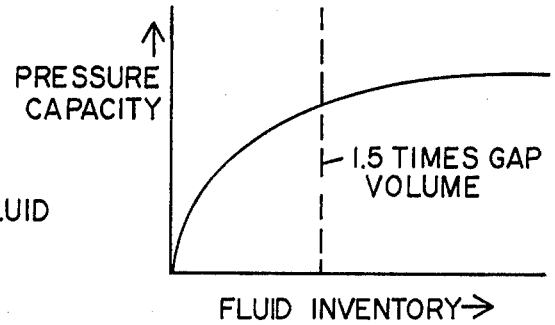
FIG. 2 is a graphical representation of the pressure capacity of a single-stage ferrofluid seal as a function of ferrofluid inventory.

FIG. 2 is a graphical illustration of the pressure capacity of a single-stage ferrofluid seal as a function of the ferrofluid inventory at the seal stage. FIG. 2 shows that, with no ferrofluid under the single stage, no pressure capacity is associated with the stage. FIG. 2 shows that the pressure capacity of the single stage increases with the ferrofluid quantity beneath the radial gap, and then it becomes fairly independent of ferrofluid quantity beneath the gap. In order to achieve the maximum pressure capacity of a single-stage seal, it has been found that the ferrofluid amount required is roughly one and a half times the air-gap volume of the radial gap under the single stage. As illustrated, a change in the ferrofluid quantity below the optimum volume results in a change of pressure capacity of the single-stage ferrofluid seal.

Figure 3:
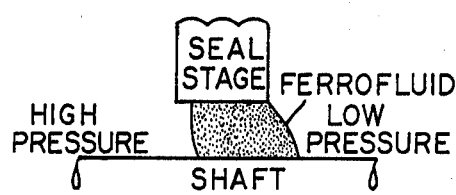
FIG. 3 is a schematic illustration of a single-stage ferrofluid seal, with a difference of pressure across the seal stage.

FIG. 3 is an illustration of a single-stage ferrofluid seal, representing the point of maximum pressure capacity of the ferrofluid seal, when there exists a high-pressure environment on one side of the ferrofluid seal and a low-pressure environment on the other side. The single stage as shown in FIG. 3 is balanced, and any change in the ferrofluid shape, resulting from the gain or less of ferrofluid in the adjoining stages, would cause the pressure capacity of the stage to change. As illustrated, the ferrofluid in the balanced stage has the line of the fluid on the high-pressure side disposed at the end of the pole piece, while the other line of the ferrofluid bulges outwardly toward the low-pressure environment. The particular shape, as illustrated in FIG. 3, is for illustration purposes only. Furthermore, it has been discovered that the pressure capacity of the single-stage ferrofluid seal, as illustrated particularly in FIG. 3, may change with time, due to entirely different physical mechanisms. It has been found that the submicron size of magnetic particles, which are colloidally suspended in a liquid, nonvolatile carrier, such as an organic ester, hydrocarbon, silicone oil or other fluid, are subject to strong magnetic-field gradients, and such submicron-size magnetic particles tend to aggregate in the direction of the greatest magnetic-field strength. This phenomena results in an effective increase in the magnetization of the ferrofluid in the vicinity of the single-stage edges of the pole pieces, and a decrease in the magnetization of the fluid away from the single-stage boundaries.

Figure 4:
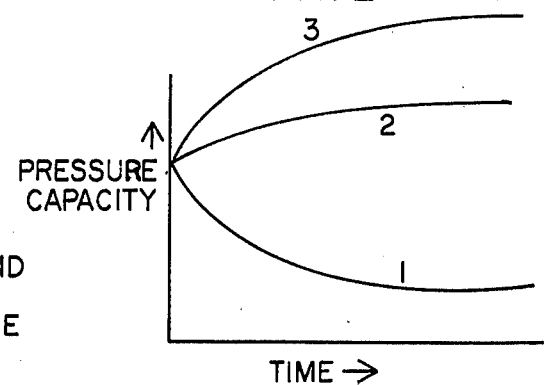
FIG. 4 is a graphical illustration of pressure capacity versus time for a single-stage ferrofluid seal.
Figure 5:
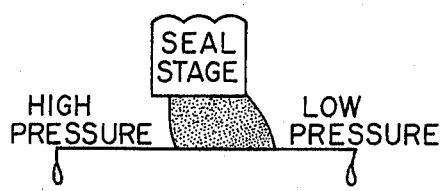
FIGS. 5a and 5b are schematic ilustrations of a single-stage ferrofluid seal, both in a steady-state condition in FIG. 5a and a single-stage seal during an air burst in FIG. 5b.
Figure 5:
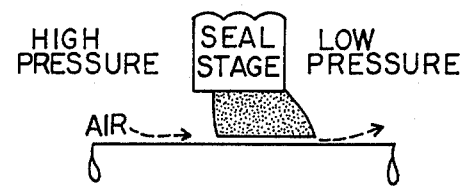

It has been found that the net effect of this phenomena for a single-stage ferrofluid seal; that is, undisturbed, is to have a net pressure capacity for one of its stages, as particularly illustrated graphically in FIG. 4. In FIG. 4, the curve 1 corresponds to the ferrofluid inventory that is below the optimum value, as illustrated in FIG. 2, while curve 3 corresponds to the ferrofluid inventory in excess of the optimum value, as shown in FIG. 2. Curve 2 of FIG. 4 is representative of a ferrofluid inventory between the two extremes of curves 1 and 2. As demonstrated by FIG. 4, it is possible that the ferrofluid inventory under the single stage is present in approximate, proper amounts. The pressure capacity of the single stage will remain fairly independent with time.

Where a ferrofluid seal mechanism is employed in an atmosphere/vacuum system, air bursts; that is, bursting of the seals, result in the introduction of a minute quantity of air from the atmosphere into the vacuum environment, which often is evidenced by residual gas analysis of the vacuum system. Thus, in a vacuum system, a system designed for $10^{-6}$ TORR pressure or less, pressure may be increased temporarily, due to the air burst by failure of the ferrofluid seal. The burst of air may originate from any of the interstage regions of the ferrofluid seal near the vacuum side of the environment, and typically will function in a cascade fashion toward the vacuum or low-pressure side, consistent with the movement of the air from the high-pressure to the low-pressure side. In such a system, the low vacuum system is the point of lowest pressure, and the interstage region, starting from the vacuum side toward the high-pressure side, represents successively higher pressure regimens in each stage. It has been found that the first several stages on the vacuum side are typically critically balanced, and the pressure capacity can be influenced by various factors. In such an environment, each stage acts like a valve; that is, the stage lifts up or moves to relieve excess pressure within the interstage region and then is promptly resealed. The motion of any ferrofluid single stage, at the time of the air burst, typically represents a departure from its steady-state condition.

FIG. 5a is a schematic illustration of a single-stage ferrofluid seal in a critically balanced stage; that is, just prior to air burst, but shown in a steady-state condition. FIG. 5b is a schematic illustration of a single-stage ferrofluid seal after an air burst has occurred, and wherein gas; that is, air, moves from the high pressure side between the lifting up of the ferrofluid and between the ferrofluid phase boundary and the surface of the shaft into the low-pressure or vacuum environment. It has been found that it may take some time before the single stage after bursting, as illustrated in FIG. 5b, returns to the original steady-stage condition, as illustrated in FIG. 5a. Of course, at this time, another air burst may occur, depending on seal factors, and thus this air-burst phenomena may be repeated periodically, leading to a diminution in the effectiveness of the ferrofluid seal.

It has been discovered that, if the air in the first interstage region of volume next to the first stage on the vacuum side, which causes the air burst, is pumped out or is maintained at a desirable, low pressure, using a vacuum pump or other vacuum means, air bursts entering the vacuum system or the low-pressure side will be prevented. It should be noted that the ferrofluid stages, after the first vacuum stage, are under the multiple-stage pole piece and still may continue to be subject to periodic air bursts. However, with the seal apparatus of the invention, such air bursts will not affect the low-pressure system. Existing and prior-art ferrofluid seal designs, with a plurality of stages, particularly close stages, on each side of the pole pieces, do not allow this concept of preventing air bursts to be achieved easily.

Figure 6:
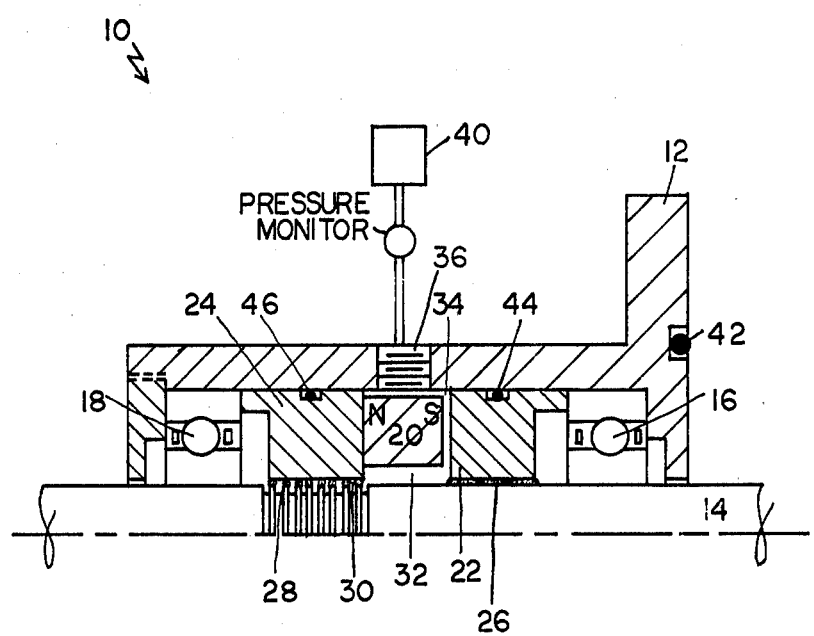
FIG. 6 is a partial sectional illustration of one portion of a nonbursting ferrofluid seal of the invention used in an atmosphere-vacuum system.

A nonbursting, multiple-stage ferrofluid seal apparatus, as shown in a particular atmosphere/vacuum system environment, is illustrated in FIG. 6. As illustrated in FIG. 6, there is a single-stage seal beneath one of the pole pieces on the vacuum side, while all of the other multiple stages beneath the other pole piece are on the atmospheric or high-pressure side, and provide a particular design pressure capacity of the ferrofluid seal, typically greater than 1 atmosphere, and more particularly about 2 atmospheres. FIG. 6 shows an interstage regional volume between the first ferrofluid stage and the remaining multiple stages under the other pole pieces, represented by the volume beneath the annular permanent magnet. This first interstage volume is maintained at a particular low pressure; for example, in an atmosphere/vacuum system at a pressure of less than $10^{-4}$ TORR, such as from $10^{-1}$ to $10^{-3}$ TORR, through the use of a vacuum pump or vacuum means and a passageway which extends into the first interstage volume. Typically, the interstage volume is pumped out through a port on the seal housing. The ferrofluid seal apparatus is designed with a narrow slit, conduit or passageway formed between the vacuum-side pole piece and the multiple stages of the atmospheric pole piece, with the permanent magnet providing a separation between the pole pieces. A space above the permanent magnet may provide a conductance path for the pumping out of the air from the first interstage volume. A proper alignment of the ferrofluid O-rings, as shown in multiple stages under one of the pole pieces in FIG. 6, seals the vacuum atmospheric and provides the desired pressure.

A nonbursting system, which includes the nonbursting, multiple-stage ferrofluid seal apparatus of the invention, is described for the purpose of illustration only in connection with FIG. 6, wherein a system 10 is shown containing a multiple-stage/single-stage seal apparatus within a seal housing 12, which seal housing surrounds a rotatable shaft 14, the housing and seal separating a high-pressure environment; that is, the atmosphere, from a low-pressure environment; that is, a vacuum chamber. The seal apparatus includes a pair of bearings 16 and 18 and includes an annular permanent magnet 20 with annular magnetically permeable pole pieces 22 and 24. The ferrofluid seal shows a single-stage ferrofluid seal 26 under one end of pole piece 22, the dotted lines representing the extension of the O-ring ferrofluid seal across the surface of the shaft 14. The other pole piece 24 forms a plurality of multiple-stage ferrofluid seals 30, by virtue of a plurality of ridges 28 formed on the rotatable shaft 14. Optionally, of course, such ridges may be formed on the end of the pole piece 24, with the shaft having a smooth surface. The annular pole pieces 22 and 24 and the annular magnet 20, shown as surrounding the rotatable shaft 14, define therebetween, together with the single stage 26 and the second stage of the multiple-stage ferrofluid seals, a first interstage volume 32. The first interstage volume, representing an annular volume about the rotating shaft 14, contains a drilled hole or passageway 34 which extends into a space above the annular magnet 36 and into a port, with a conduit line to a vacuum pump 40, which may include a pressure-monitor means, to operate the pump to maintain the desired pressure in volume 32. An O-ring 42 is employed to provide for a seal of the housing against the vacuum chamber, while O-rings 44 and 46 provide seals between the pole pieces 22 and 24 and the seal housing 12.

FIG. 6 is a one-half sectional view of the ferrofluid seal of the invention, with the other half sectional view (not shown) on the other lower side of the shaft being the same view, except wihout the passageway 34, port 36 or pump 40.

In the embodiment illustrated, the vacuum; for example, at $1 \times 10^{-6}$ TORR or less, represents the vacuum environment, while the atmosphere represents the high-pressure environment. The multiple-stage seal 30 is designed to provide pressure capacity of about 2 atmospheres. In the embodiment illustrated, the vacuum pump, which, optionally, may be the same vacuum pump to maintain the vacuum chamber at the desired temperature, or a separate pump, maintains the interstage volume 32 at an intermediate pressure between the atmospheric and vacuum pressures, typically a pressure, for example, of $10^{-1}$ to $10^{-3}$ TORR, through the periodic or continuous evacuation of air from the interstage volume 32 through the drilled passageway 34, through volume 36 and the port. If desired, the volume 32 can be maintained at the same pressure as that of the vacuum chamber. As illustrated, the first-stage ferrofluid seal provides for a nonbursting seal, while the multiple-stage ferrofluid seal provides for pressure capacity required between the high- and low-pressure environments.

The dimensions of the radial gaps and the type of ferrofluids employed in the nonbursting ferrofluid seal of the invention may vary. However, it is often desirable, in the nonbursting seal apparatus of the invention, to employ a large radial gap on the vacuum-side, single-stage ferrofluid seal 26, and a smaller radial gap on the atmospheric-side, multiple-stage seal 30. Typically, conventional ferrofluid seals employed in such systems are designed with radial gaps of from 2 to 3 mils and a ferrofluid-saturation-magnetization value of up to 450 gauss and a viscosity of 500 cps at 27° C. It is desirable to have the single-stage radial gap have a larger radial gap than necessary, to minimize the factors that contribute to bursting, as heretofore set forth, such as eccentricity and magnetic-field variations; that is, to provide a larger ferrofluid inventory beneath the seal. As shown particularly in FIG. 2, the maximum pressure capacity represents roughly one and a half times the air-gap volume, which is calculated based on the approximate shape of the ferrofluid, as illustrated in FIG. 1. Thus, for example, the single-stage seal may have a gap ranging from about 4 to 12 mil on the vacuum side, while a multiple-stage seal may have a gap ranging from about 2 to 6 mil on the atmospheric side in one preferred embodiment. The large gaps are desirable to minimize the effects of eccentricity and magnetic field variations as well as to provide a long life for the nonbursting seal.

A variety of ferrofluids may be employed in the nonbursting seal of the invention. Generally, the same ferrofluid composition is employed, both in the single-stage and multiple-stage seals. Typical ferrofluids would include ferrofluids having a magnetization in gauss ranging from 200 to 1000; for example, 500 to 1000, and a viscosity of 50 cps to 900 cps; for example, 50 to 300 cps at 27° C. The carrier liquid in the ferrofluid usually comprises a nonvolatile liquid carrier, such as silicone oil, hydrocarbon, ester or other liquid carrier. It is desirable to employ ferrofluids with saturation magnetization values approaching 1000 gauss in the nonbursting seals, to achieve sufficient pressure capacity in the presence of low-magnetic-field gradients, and to minimize the time-dependent ferrofluid changes resulting from particle agglomeration diffusion in the ferrofluid. A high-gauss ferrofluid, such as a 1000-gauss ferrofluid, is characterized with a particle density allowing essentially little variation for particle agglomeration. The single-stage ferrofluid seal 26 is usually formed by employing a precise quantity of the ferrofluid, using a microdispenser, which is added to the vacuum side of the single stage, to ensure further stability of the stage against bursting. Various combinations of ferrofluid viscosity and ferrofluid magnetization, with varying radial gaps as low as 2 mils, have been tested and found satisfactory and to have shown encouragingly little or no bursting, when the vacuum side is in the $10^{-6}$ or lower TORR range.

What is claimed is:

1. A nonbursting, ferrofluid seal apparatus to provide a ferrofluid seal about a shaft element between a first high-pressure and a second low-pressure environment, which seal apparatus comprises in combination:
   (a) a permanent magnet having a one end and another end;
   (b) first and second pole pieces, each having a one and another end, the other end of each of the pole pieces in a magnetic-flux relationship with the one end of the permanent magnet, and the other ends of the first and second pole pieces extending into a close, noncontacting relationship with the surface of the shaft element to be sealed, to define a radial gap between the respective other ends of the pole pieces and the surface of the shaft element;
   (c) the first pole piece on the high-pressure side of the first high-pressure environment at the other end thereof, or the portion of the surface of the shaft employed therewith adjacent to the other end, having a plurality of ridges thereon, to form with a ferrofluid a plurality of separate, multiple, seal stages beneath the other end of the first pole piece, to provide a defined pressure capacity to the seal apparatus, which pressure capacity is greater than the high pressure of the first high-pressure environment;
   (d) the other end of the second pole piece and the surface of the shaft element defining a first-stage radial gap, to form with a ferrofluid, on the low-pressure side of the second environment, a single-stage ferrofluidic seal;
   (e) the permanent magnet, the first and second pole pieces and the multiple-stage ferrofluid and the single-stage ferrofluid seals defining a first interstage volume between the single-stage ferrofluid seal and the first stage of the multiple-stage seal;
   (f) ferrofluid magnetically retained under the other end of the first and second pole pieces, to provide a multiple-stage pressure-capacity seal under the other end of the first pole piece and a single-stage ferrofluid seal under the other end of the second pole piece;
   (g) passageway means extending into the first-stage volume; and
   (h) means to remove air from the interstage volume through the passageway means, to maintain the interstage volume at a defined low pressure between the first high- and second low-pressure environments, thereby providing a nonbursting, first-stage ferrofluidic seal in a stable, nonbursting condition.

2. The seal apparatus of claim 1 wherein the means to remove air comprises a vacuum pump in fluid communication with the passageway means.

3. The seal apparatus of claim 1 wherein the ferrofluid comprises a nonvolatile liquid carrier and has a magnetization of about 200 to 1000 gauss and a viscosity of from about 50 cps to 900 cps at 27° C.

4. The seal apparatus of claim 1 wherein the means to remove air from the first interstage volume maintains the first interstage volume at a pressure of from about $10^{-1}$ to $10^{-3}$ TORR.

5. The seal apparatus of claim 1 wherein the radial gap under the other end of the second pole piece, to define the single-stage ferrofluid seal, is larger than the radial gaps under the first pole piece which forms the multiple-stage ferrofluid seal.

6. The seal apparatus of claim 1 wherein the ferrofluid, which forms the first-stage ferrofluid seal, has a volume of approximately one and a half times the radial gap of the first-stage ferrofluid seal.

7. A nonbursting, high- and low-pressure ferrofluid seal system which comprises a high-pressure environment, a low-pressure environment, a rotatable shaft element passing between the high-pressure and low-pressure environments, and a seal apparatus of claim 1 disposed about the shaft element, to provide a ferrofluid seal between the high- and low-pressure environments, the single-stage ferrofluid seal disposed on the low-pressure environment side of the system.

8. The system in claim 7 wherein the high-pressure environment comprises atmospheric pressure and the low-pressure environment comprises a vacuum of about $10^{-6}$ TORR or less.

9. The seal system of claim 7 which includes a pressure-monitoring means to monitor the pressure in the first interstage volume and to operate the means to remove air to maintain the interstage volume at a defined, monitored pressure.

10. A method of providing a nonbursting ferrofluid seal about a shaft element extending between a high- and low-pressure environment, which method comprises:
 (a) providing a ferrofluid seal apparatus about the shaft element, the seal apparatus having a multiple-stage ferrofluid seal about the shaft on the high-pressure environment side of the shaft element, and a single-stage ferrofluid seal on the low-pressure environment side, the first stage of the multiple-stage seal and the single-stage seal defining therebetween a first, sealed, interstage volume about the shaft element; and
 (b) maintaining the first interstage volume at a defined pressure between the low- and high-pressure environments, thereby preventing or inhibiting the bursting of the single-stage seal.

11. The method of claim 10 wherein the low-pressure environment comprises a vacuum of about $10^{-6}$ TORR or less.

12. The method of claim 10 which includes maintaining the first interstage volume at about $10^{-1}$ to $10^{-3}$ TORR.

13. The method of claim 10 which includes forming a radial gap for the single-stage ferrofluid seal of larger dimension than the radical gap formed for the multiple-stage ferrofluid seal.

14. The method of claim 10 which includes maintaining the first interstage volume by pumping continuously or periodically air out of the first interstage volume.

15. The method of claim 10 which includes monitoring the pressure of the first interstage volume and operating a vacuum pump, to remove air from the interstage volume responsive to the monitoring of the interstage volume.

* * * * *

UNITED STATES PATENT AND TRADEMARK OFFICE
CERTIFICATE OF CORRECTION

PATENT NO. : 4,407,518
DATED : October 4, 1983
INVENTOR(S) : Ronald Moskowitz et al It is certified that error appears in the above-identified patent and that said Letters Patent is hereby corrected as shown below:

Under "Inventors" add -- Akira Yamamura, of Tokyo, Japan --.

Signed and Sealed this

Tenth Day of April 1984

[SEAL]

Attest:

GERALD J. MOSSINGHOFF

Attesting Officer     Commissioner of Patents and Trademarks